US006860501B2

(12) United States Patent
Schmidt et al.

(10) Patent No.: US 6,860,501 B2
(45) Date of Patent: Mar. 1, 2005

(54) WEIGHT DISTRIBUTING HITCH ASSEMBLY

(75) Inventors: Kenneth R. Schmidt, Canton, MI (US); Lynn Mida, Chelsea, MI (US); David L. Hoelscher, Livonia, MI (US); Neal Weipert, Redford, MI (US)

(73) Assignee: Coquent Towing Products, Inc., Plymouth, MI (US)

( * ) Notice: Subject to any disclaimer, the term of this patent is extended or adjusted under 35 U.S.C. 154(b) by 0 days.

(21) Appl. No.: 10/222,064

(22) Filed: Aug. 16, 2002

(65) Prior Publication Data

US 2002/0190498 A1 Dec. 19, 2002

Related U.S. Application Data

(63) Continuation of application No. 09/611,064, filed on Jul. 6, 2000, now abandoned.
(60) Provisional application No. 60/142,783, filed on Jul. 8, 1999.

(51) Int. Cl.$^7$ .................................................. B60D 1/30
(52) U.S. Cl. .................. 280/455.1; 280/432; 280/405.1
(58) Field of Search .............................. 280/455.1, 432, 280/405.1, 406.2

(56) References Cited

U.S. PATENT DOCUMENTS

| | | | |
|---|---|---|---|
| 2,709,604 A | 5/1955 | Hartman | |
| 2,738,206 A | 3/1956 | Loughner | |
| 2,789,834 A | 4/1957 | Chism | |
| 3,482,856 A | 12/1969 | Reese | |
| 3,655,221 A | 4/1972 | Warner | |
| 3,679,231 A | 7/1972 | Derr, Jr. | |
| 3,717,364 A | 2/1973 | McClive | |
| 3,778,088 A | 12/1973 | Alexander | |
| 4,053,174 A | 10/1977 | Guettler, Jr. | |
| 4,230,333 A | 10/1980 | Persyn | |
| 4,614,353 A | 9/1986 | Meyer | |
| 4,679,812 A | 7/1987 | Byrnes | |
| 4,815,752 A | 3/1989 | Young | |
| 5,580,076 A | 12/1996 | DeRoule | |
| 5,647,603 A | 7/1997 | Kass | |
| 5,868,414 A | 2/1999 | McCoy | |
| 6,419,257 B1 * | 7/2002 | McCoy et al. | ........... 280/455.1 |

* cited by examiner

*Primary Examiner*—Lesley D. Morris
*Assistant Examiner*—Matt Luby
(74) *Attorney, Agent, or Firm*—Robert H. Earp, III; McDonald Hopkins Co., LPA; Todd A. Benni (57) ABSTRACT

A weight distributing hitch assembly includes a shank, hitch head, spring bar and lift assembly. The lift assembly is preferably removably mountable to the frame members of a trailer frame while the spring bar extends below the frame members relative to the ground. The lift assembly mounts a hanger assembly which engages a cantilevered segment of the spring bar to drive the spring bar from a free state to a loaded state to distribute the hitch load to a towing vehicle as well as to the trailer. A lever assembly mounts the hanger assembly to the lift assembly and supplies mechanical advantage to assist a user during tensioning of the spring bar. By moving the lever assembly, the cam rotates about a pivot. As the hanger assembly is engaged with the cam, the hanger assembly is driven from a disengaged position to an engaged position which moves the spring bar from its free state to its loaded state with a minimum of user effort.

14 Claims, 8 Drawing Sheets

WEIGHT DISTRIBUTING HITCH ASSEMBLY

The present application claims priority to U.S. Provisional Patent Application Ser. No. 60/142,783 filed Jul. 8, 1999 and is a continuation of U.S. patent application Ser. No. 09/611,064 filed Jul. 6, 2000, now abandoned.

BACKGROUND OF THE INVENTION

The present invention relates to a vehicle hitch assembly, and more particularly to hitch assembly that transmits and distributes a part of the load from the trailer to the front and rear wheels of the towing vehicle.

Hitch assemblies for more evenly distributing the tongue weight of a trailer over the front and rear axles of a towing vehicle are well known in the art. A typical hitch assembly includes a hitch bar for receipt in a receiver mounted to the vehicle and a ball mount head for mounting on the hitch bar at a selected tilt angle. A pair of spring bars are mounted at their proximal ends to the ball mount head. The distal ends of these spring bars are connected by cooperating lift units and chains to the frame of the trailer. A typical lift unit incorporates a body that is mounted to the trailer frame, a pivoting chain hook, and a safety clip for securing the chain hook in an operative position. As is known in the art, the amount of leveling or load transfer to the front axle of the vehicle is adjusted by engaging different links of the chains with the chain hooks of the lift units.

While such an arrangement is effective for its intended purpose, the lift units must be properly mounted to the trailer frame and the proper chain links engaged in the chain hooks in order to provide proper operation and a desired distribution of weight.

While relatively simple, these procedures require some time to complete and may be difficult to accomplish. Moreover, this arrangement may interfere with side mounted tongue jacks typically found on lightweight trailers.

Accordingly, it is desirable to provide a weight distributing hitch assembly allowing greater ease and convenience of installation and operation. This is particularly true with respect to the connection of the distal end of the spring bars to the trailer frame in order to provide the weight distributing action.

SUMMARY OF THE INVENTION

The weight distributing hitch assembly according to the present invention includes a shank, head, spring bar and lift assembly. The shank is sized to have exterior dimensions for mating engagement within a female hitch end mounted to a towing vehicle. The head is adjustable relative to the shank to align a trailer frame of a trailer with the female hitch end.

The lift assembly includes a hanger assembly which engages a cantilevered segment of the spring bar. The spring bar is preferably L-shaped such that the cantilevered segment is substantially perpendicular to a mount segment which engages a vertical pivot of the hitch head.

The hanger assembly is movable by the lift assembly to engage the cantilevered segment of the spring bar and drive the spring bar from a free state to a loaded state. As the spring bar is preferably manufactured of a resilient material such as steel, the spring bar will resist the loaded state and will attempt to return to its free state. In its loaded state, the spring bar transfers part of the load from the trailer to the towing vehicle which serves to distribute the hitch load to the towing vehicle as well as to the trailer.

The lift assembly is preferably removably mounted above the frame members of the trailer frame while the spring bar extends below the frame members relative to the ground. Although an A-frame type trailer frame is illustrated in one of the disclosed embodiments, it should be realized that many trailers will benefit from the present invention.

In another disclosed embodiment a center-mounted trailer tongue jack is located along a longitudinal axis defined by the trailer frame. In this embodiment, the spring bar is preferably bent to clear the center-mounted trailer tongue jack. Accordingly, with only the substitution of spring bar another trailer frame configuration benefits from the present invention.

One embodiment of the lift assembly includes a lever assembly that mounts the hanger assembly to the lift assembly and supplies mechanical advantage to assist a user during tensioning of the spring bar. The lever assembly includes a handle which drives a cam about a pivot, or produces cam type articulation of a hook. By moving the lever assembly, the cam or hook rotates about the pivot. As the hanger assembly is engaged, the hanger assembly is driven from a disengaged position to an engaged position which moves the spring bar from its free state to its loaded state.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
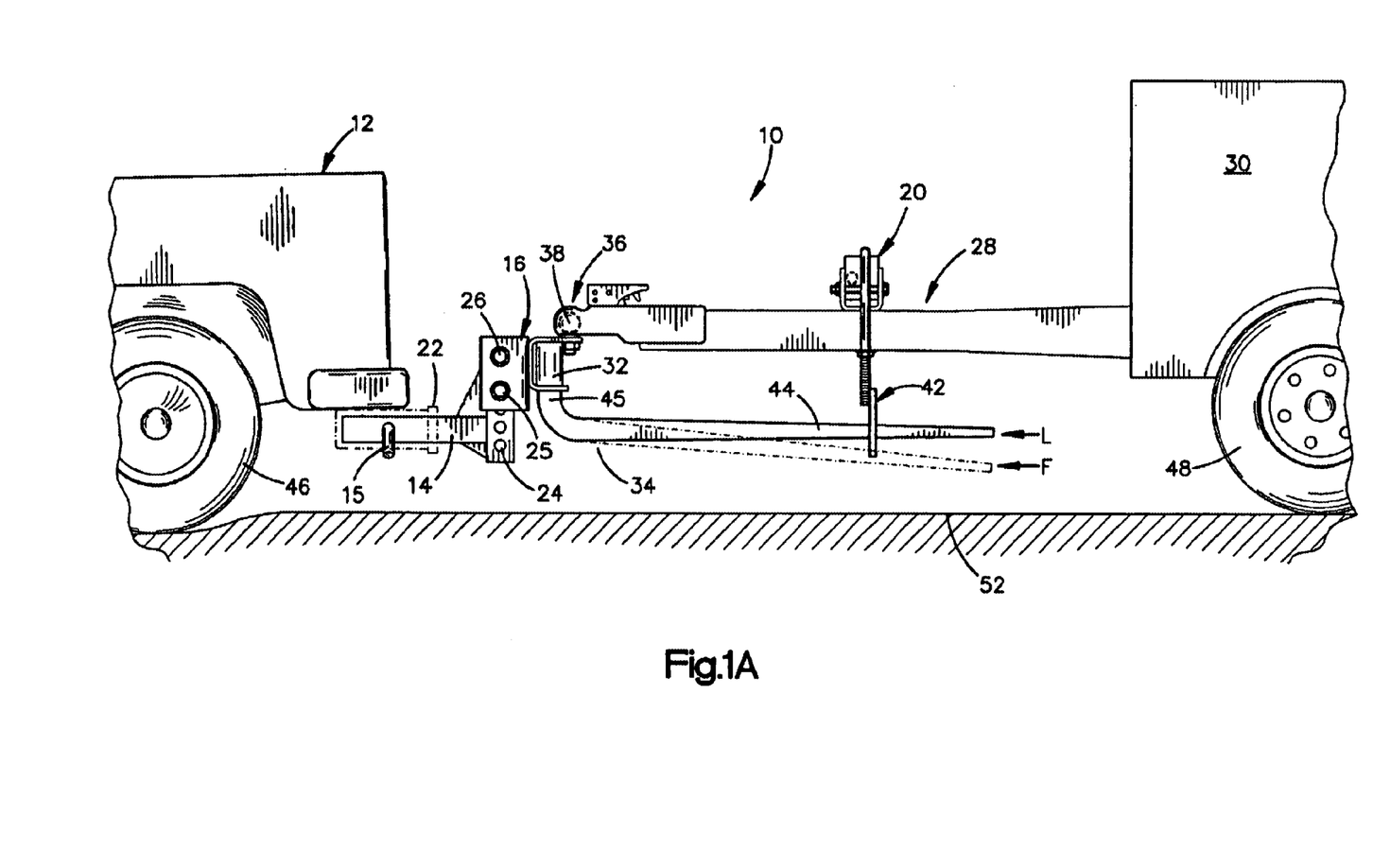
FIG. 1A is a side view of a vehicle weight distributing hitch assembly according to the present invention.

FIG. 1A illustrates a weight distributing hitch assembly 10 for attachment to a vehicle 12. The hitch assembly 10 generally includes a shank 14, head 16, spring bar 34 and lift assembly 20. The shank 14 is sized to have exterior dimensions for mating engagement within a female hitch end 22 mounted to the vehicle 12. Preferably, a hitch pin 15 or the like retains the shank 14 within the female hitch end 22.

The head 16 is preferably adjustable relative to the shank 14. Apertures 24 through the shank 14 correspond with apertures 25 through the head 16 to receive fasteners 26 such as bolts 26. The height of the head 16 is adjusted relative to the shank 14 to align the trailer frame 28 of the trailer 30 with the female hitch end 22. Once the head 16 is adjusted to the desired height along the shank 14, the fasteners 26 are inserted through the apertures 24 to retain the head 16 to the shank 14.

The head 16 further includes a vertical pivot 32 to receive a spring bar 34. The spring bar 34 is preferably an elongated cantilever spring member that is detachably and pivotally mounted adjacent a hitch ball socket assembly 36 mounted to the trailer frame 28. The trailer frame 28 is connected to a towing ball 38 or the like which is mounted to the head 16. The specific attachment of the hitch ball socket assembly 36 and towing ball 38 forms no part of the present invention and it should be understood that many arrangements will benefit from the present invention.

As will be further described below, the lift assembly 20 includes a hanger assembly 42 which engages a cantilevered segment 44 of the spring bar 34. The spring bar 34 is preferably L-shaped such that the cantilevered segment 44 is substantially perpendicular to a mount segment 45 which engages the vertical pivot 32. The cantilevered segment 44 and the mount segment 45 are located within a common plane (FIG. 1B), however, as described in another embodiment (FIGS. 2A, and 2B) a portion of the cantilevered segment 44 can extend from the common plane to benefit other trailer frame configurations.

The hanger assembly 42 is movable by the lift assembly 20, to engage the cantilevered segment 44 of the spring bar 34 and drive the spring bar 34 from its free state (shown in phantom at F) to a loaded state L. As the spring bar 34 is preferably manufactured of a resilient material such as steel, the spring bar 34 will resist the loaded state L and will attempt to return to its free state F. In its loaded state L, the spring bar 34 transfers a part of the load from the trailer 30 to the towing vehicle 12 and serves to distribute the hitch load to the wheels 46 of the towing vehicle 12 as well as to the trailer wheels 48.

Figure 1B:
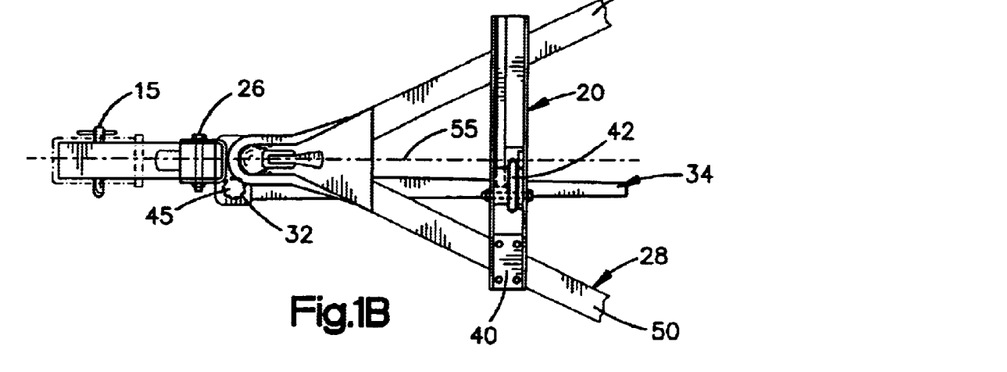
FIG. 1B is an expanded top view of the vehicle weight distributing hitch assembly illustrated in FIG. 1A.

Referring to FIG. 1B, the lift assembly 20 is preferably removably mountable to the trailer frame 28 by a clamp 40 or the like. The lift assembly 20 is preferably mounted above the frame members 50 of the trailer frame 28 and the spring bar 34 extends below the frame members 50 relative to the ground 51 (FIG. 1A). By locating the lift assembly 20 above the trailer frame 28 and the spring bar 34 below, only a small position retaining clamp such as clamp 40 is required to retain the lift assembly 20. The lift assembly 20 can thereby be rapidly installed and disconnected to be conveniently stored when the hitch is not in use.

As illustrated in FIG. 1B, the spring bar 34 is substantially straight and runs substantially parallel to a longitudinal axis 55 defined by the trailer frame 28. Although an A-frame type trailer frame is illustrated in the disclosed embodiment, it should be realized that many trailers will benefit from the present invention. Preferably, the hanger assembly 42 extends through an opening 53 in the lift assembly 20 base 52 to engage the cantilevered segment 44 of the spring bar 34 (FIG. 1C).

Figure 2A:
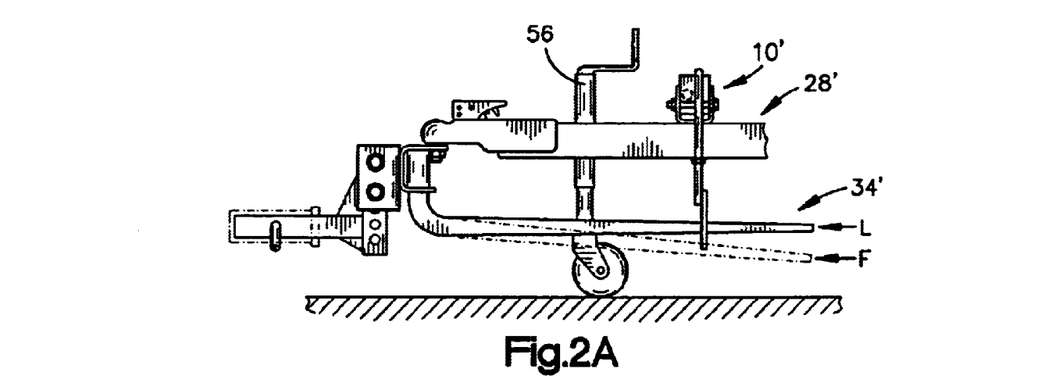
FIG. 2A is a side view of another embodiment of a vehicle weight distributing hitch assembly according to the present invention.

Referring to FIG. 2A another trailer frame 28' is illustrated. The trailer frame 28' includes a center-mounted trailer tongue jack 56. The components of the weight distributing hitch assembly 10' are otherwise substantially similar to the embodiment of FIG. 1A, 1B and identical numerals are used.

Figures 1C, 2B:
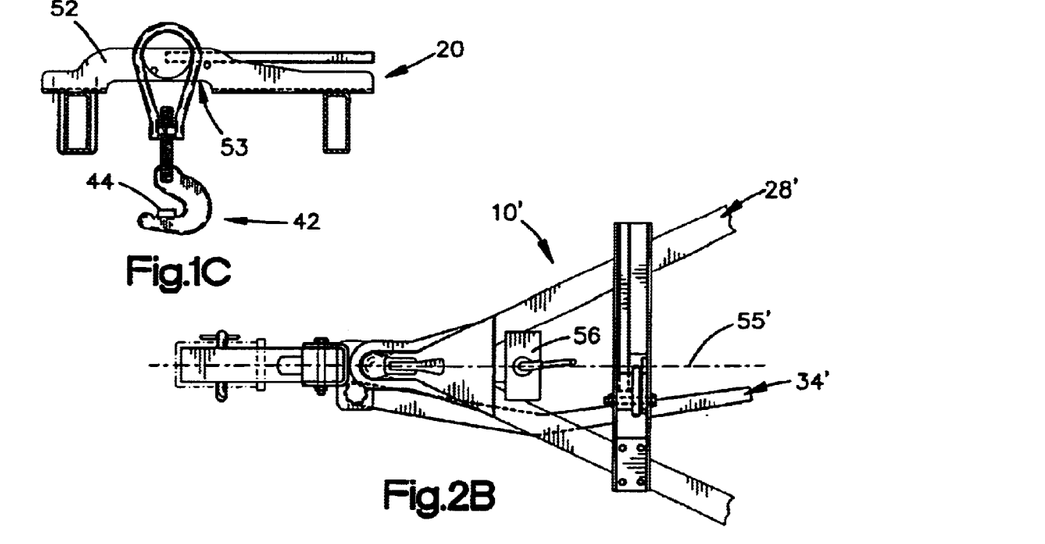
FIG. 1C is a side view of a lift assembly engaged with the spring bar.
FIG. 2B is an expanded top view of the vehicle weight distributing hitch assembly illustrated in FIG. 2A.

Referring to FIG. 2B, the center-mounted trailer tongue jack 56 is located along a longitudinal axis 55' defined by the trailer frame 28'. The spring bar 34' is preferably bent to clear the center-mounted trailer tongue jack 56. Accordingly, with only the substitution of spring bar 34' another trailer frame 28' configuration will benefit from the present invention.

Figure 3A:
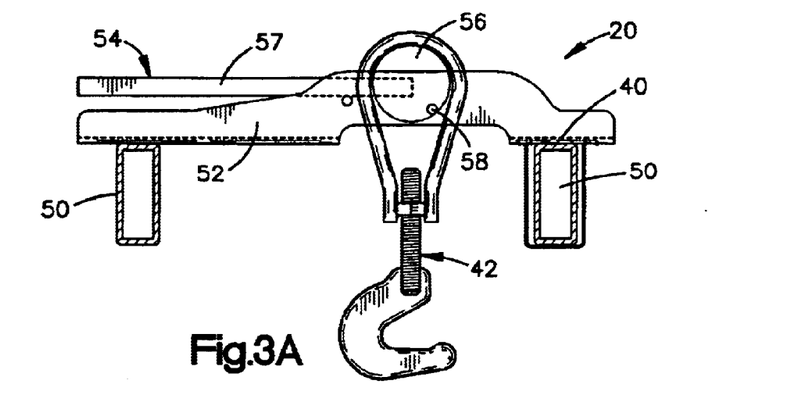
FIG. 3A is an expanded view of a lift assembly according to the present invention.
Figure 3B:
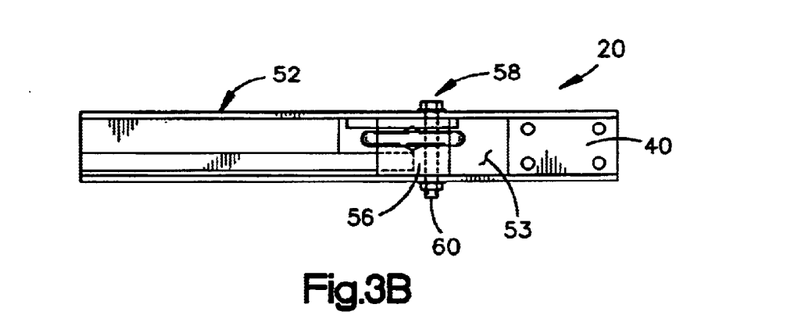
FIG. 3B is a top view of the lift assembly illustrated in FIG. 3A.

Referring to FIG. 3A, one embodiment of the lift assembly 20 is illustrated. The lift assembly 20 is removably mounted to a frame member 50 of the trailer frame 28 by the clamp 40. A lever assembly 54 mounts the hanger assembly 42 to the lift assembly 20 base 52. The lever assembly 54 includes a handle 57 which drives a cam 56 about a pivot 58. The pivot 58 includes an axle pin 60 such as a bolt which passes through the cam 56 and base 52 (FIG. 3B).

Figure 4:
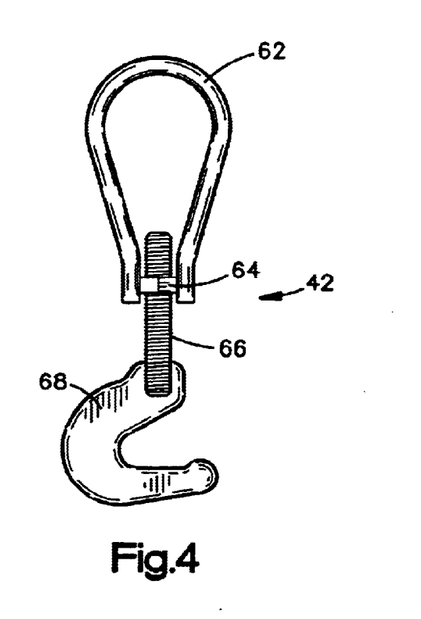
FIG. 4 is an expanded view of a hanger assembly according to the present invention.

Referring to FIG. 4, the hanger assembly 42 includes a wire form 62 which retains a threaded fastener 64 such as a nut. The threaded fastener 64 is preferably fixed to the wire form 62 by welding or the like. The threaded fastener 64 receives a threaded rod 66 which is attached to a hook 68. The hook 68 is adjustable for length by threading the threaded rod 66 into the threaded fastener 64. Accordingly, rather small incremental adjustments can be made in the position of the hook relative to the lift assembly 20 (FIG. 1) for the leveling requirements of different tow vehicles and trailer combinations.

Figure 5:
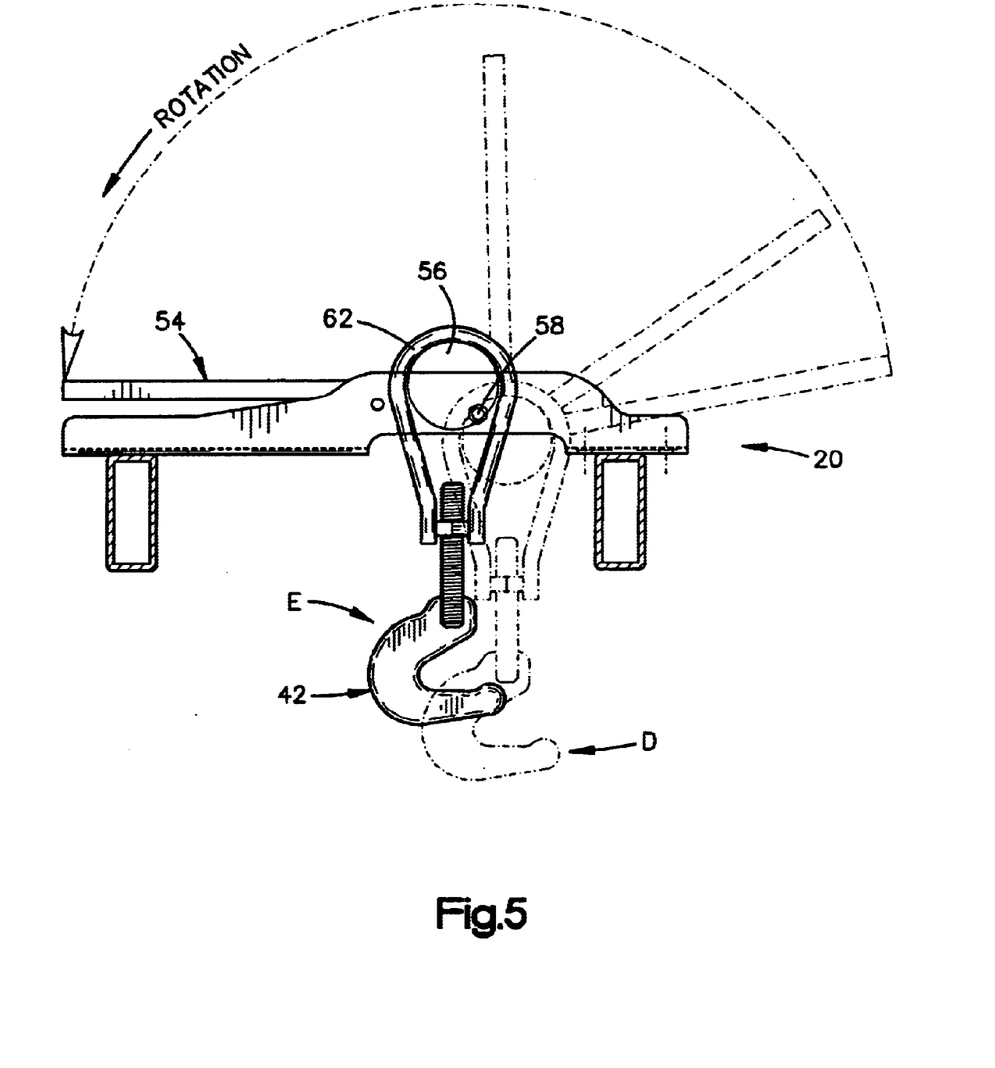
FIG. 5 is an expanded view of the lift assembly illustrated in FIG. 3 detailing operation of the hanger assembly and lever assembly.

Referring to FIG. 5, operation of the lift assembly 20 is illustrated. Lever 54 is fixed to cam 56. By moving the lever assembly 54 in the direction of arrow R, the cam 56 moves about pivot 58. The wire form 62 is engaged with the cam 56, the hanger assembly 42 is driven from a disengaged position D to an engaged position E. Accordingly, the spring bar 34 (FIG. 1A) is moved from its free state F to its loaded state L. Moreover. the lever assembly 54 and cam 56 supplies mechanical advantage to assist a user during tensioning of the spring bar 34.

To install the weight distributing hitch assembly 10 the user lowers the trailer 28 onto the head 16 (FIG. 1A). The user installs the spring bar 34 into the vertical pivot 32 on the head 16 and lowers the adjustable hanger assembly 42 on the lift mechanism 20 by rotating the lever assembly 54 per FIG. 5. The consumer swings the spring bar 34 under the trailer frame 28 and places it in the adjustable hanger assembly 42. The user raises the adjustable hanger assembly 42 by rotating the lever assembly 54. The consumer is then ready to tow. The adjustable hook 68 may be raised or lowered via threaded rod 66 and hex nut 64 (FIG. 4) for the leveling requirements of different tow vehicles and trailer combinations.

Figure 6A:
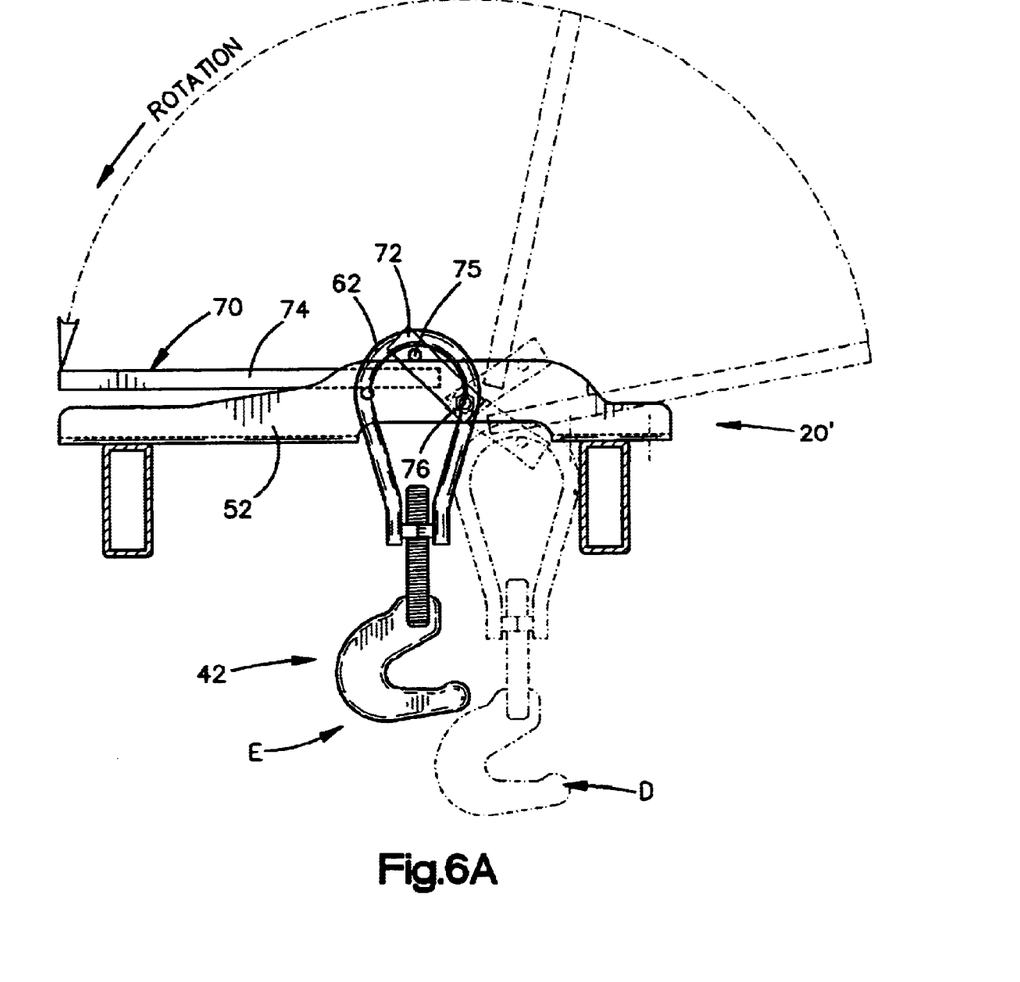
FIG. 6A is an expanded view of another lift assembly according to the present invention detailing operation of the hanger assembly and lever assembly.
Figure 6B:
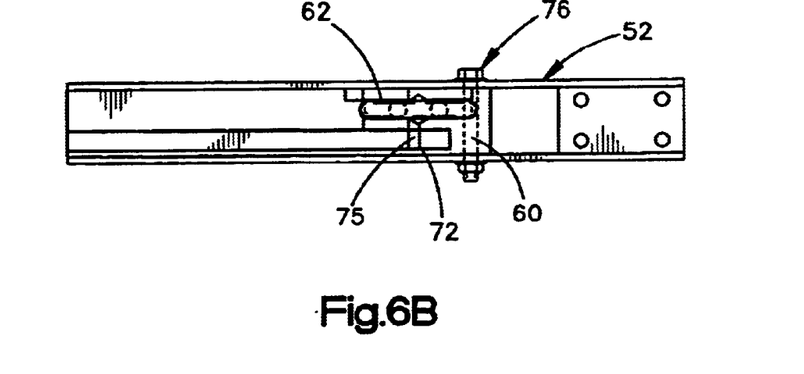
FIG. 6B is a top view of the lift assembly illustrated in FIG. 6A.

Referring to FIG. 6A, another embodiment of the lift assembly 20' is illustrated. The lift assembly 20' includes a lever assembly 70 which mounts the hanger assembly 42 with a crank 72. The crank 72 is driven by a handle 74 to rotate the crank about a pivot 76. The pivot 76 includes an axle pin 60 such as a bolt which passes through the crank 76 and base 52 (FIG. 6B). The crank 72 preferably includes a support pin 75 which supports the wireform 62 of the hanger assembly 42. The crank 72 rotates about the pivot 74 to again supply a mechanical advantage to drive the hanger assembly 42 from a disengaged position D to an engaged position E.

Figure 7:
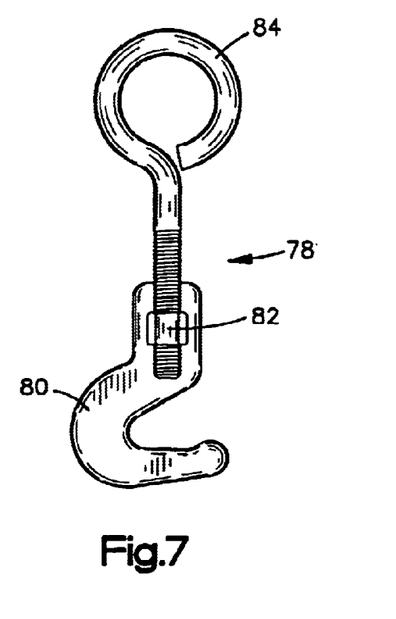
FIG. 7 is an expanded view of another hanger assembly according to the present invention.

Referring to FIG. 7 another embodiment of a hanger assembly 78 is illustrated. A formed or stamped hook 80 is welded to a hex nut 82 and an eye bolt 84 is threaded into the hex nut 82.

Figure 8:
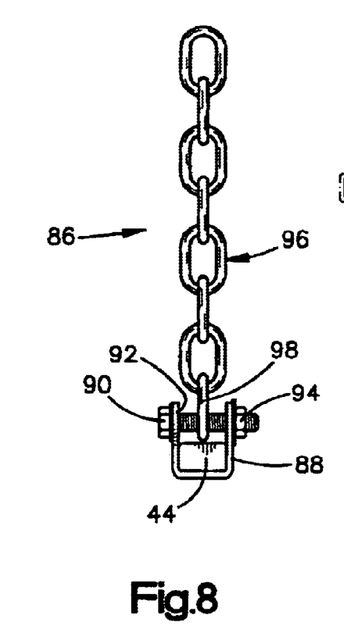
FIG. 8 is an expanded view of another hanger assembly according to the present invention.

Referring to FIG. 8 another embodiment of a hanger assembly 86 is illustrated. A U-shaped bracket 88 engages the cantilevered segment 44. A fastener 90 passes through an aperture 92 in the U-shaped bracket 88 and is retained by a hex nut 94. The fastener 92 engages a length of chain 96. Although the fastener is engaged with an end link 98 of the chain 96 it should be realized that the fastener can be engaged with any link 98 to thereby adjust the load placed on the cantilevered segment 44.

Figure 9A:
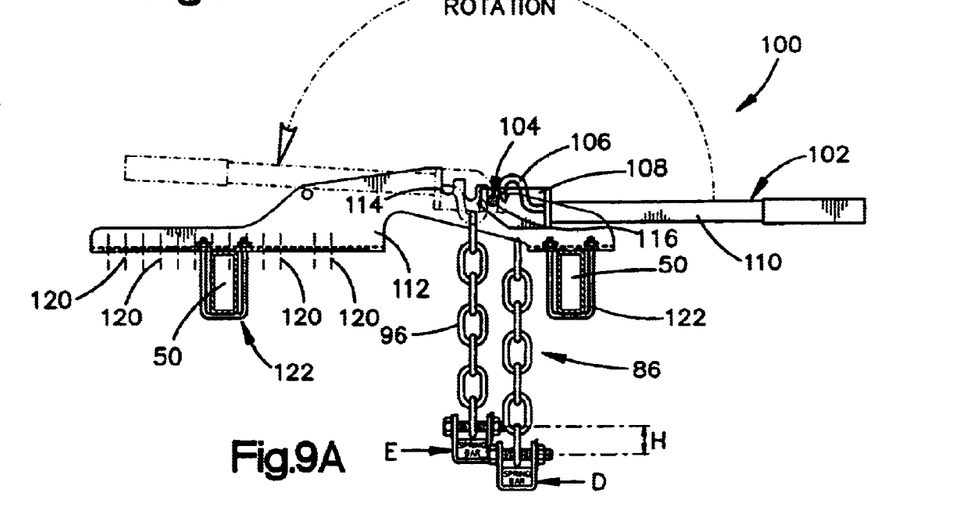
FIG. 9A is an expanded view of another lift assembly utilizing the hanger assembly illustrated in FIG. 8.

Referring to FIG. 9A, another embodiment of a lift assembly 100 is illustrated. The lift assembly 100 mounts a lever assembly 102 which mounts the hanger assembly 86. The lever assembly 102 includes a pivot 104 and retention hook 106. Preferably, a U-shaped bracket 108 is attached to a handle 110. The retention hook 106 is located between the legs of the U-shaped while the pivot 104 extends from the exterior of the U-shaped bracket 108. The retention hook 106 is offset from the pivot 104 such that the retention hook 106 is cammed about the pivot 104 to again supply a mechanical advantage to drive the hanger assembly 86 from a disengaged position D to an engaged position E.

Figure 9B:
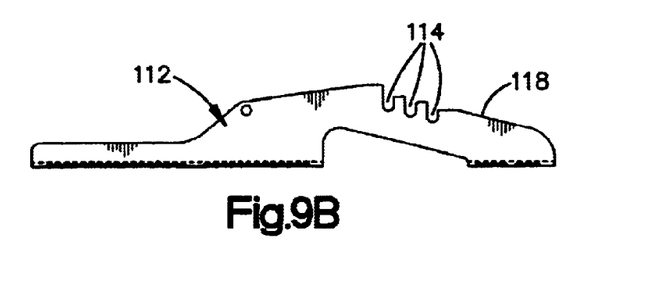
FIG. 9B is an expanded view of the lift assembly base illustrated in FIG. 9A.

Preferably, the lift assembly 100 includes a base 112 which provides a plurality of slots 114 to receive the pivot 104 (FIG. 9B). The slots 114 are located along a ramped surface 118 of the base 112 to provide an adjustable lift range H between the disengaged position D and engaged position E. The pivot 104 includes an axle pin 116 that fits within the slots 114. By locating the axle pin 116 in one of the slots 114 of the lift assembly 100, adjustment of the lift range between the disengaged position D and engaged position E is provided.

In addition, a plurality of clamp mounting apertures 120 are preferably located along the length of the base 112. The clamp mounting apertures 120 receive a clamp 122 such as a U-bolt which is engageable with a frame member 50. In addition to allowing the lift assembly 100 to be removably mounted to a frame member 50, clamp mounting apertures 120 simplify the attachment of the lift assembly 100 to multiple types of trailer frames.

Figure 10:
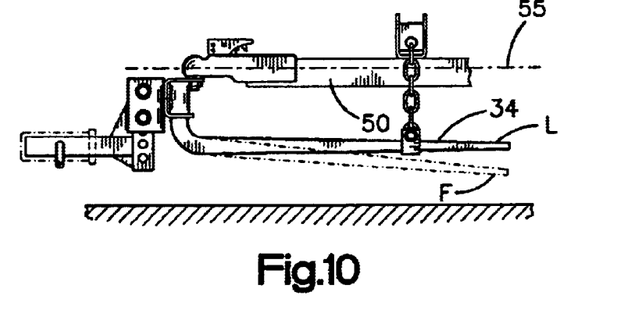
FIG. 10 is a side view of the lift assembly illustrated in FIG. 9A attached to a trailer.

In use, the lift assembly 100 is located in the desired position along the frame members 50 and the clamp 122 is engaged with the appropriate clamp mounting apertures 120. Moreover, by adjusting the mounting location of the lift assembly 100 relative to the frame members 50 and along the trailer axis 55 (FIG. 10), additional adjustment of the lift range between the disengaged position D and engaged position E is provided. Flexibility is also provided in fitting around trailer frame obstructions.

By moving the lever assembly 102 in the direction of arrow R, the retention hook 106 moves about the pivot 104. The chain 96 is engaged with the retention hook 106 and the hanger assembly 86 is driven from a disengaged position D to an engaged position E. Accordingly, the spring bar 34 (FIG. 10) is moved from its free state F to its loaded state L. As described above, by adjusting the lift assembly 100 along the frame members 50, by locating the pivot in on of the slots 114, by engaging the retention hook 106 and fastener 92 in the links 98 in the chain 96, multiple adjustments to the lift range H for multiple types of trailers 38 are provided and flexibility in fitting around obstructions on various trailer frames.

Figure 11:
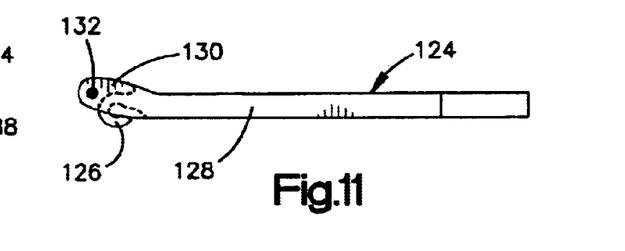
FIG. 11 is an expanded view of another embodiment of a lever assembly for use with the lift assembly illustrated in FIG. 9A.

Referring to FIG. 11, another embodiment of a lever assembly 124 is illustrated. The lever assembly 124 is a one-piece casting including a retention hook 126 attached to a handle 128. The retention hook 126 is located between the legs of a U-shaped pivot 130 which includes integrally cast pivot pins 132.

Figure 12:
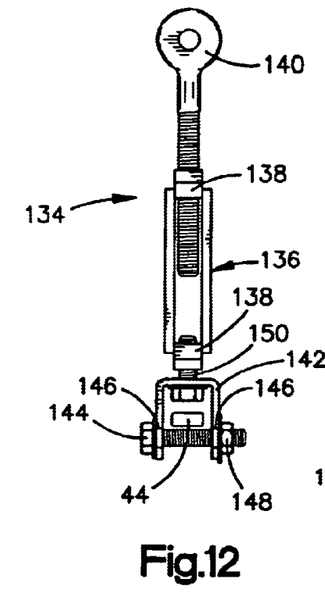
FIG. 12 is an expanded view of yet another hanger assembly according to the present invention.

Referring to FIG. 12 another embodiment of a hanger assembly 134 is illustrated. The hanger assembly 134 includes a coupler 136 having a threaded fastener 138 attached at each end. One threaded fastener 138 receives and eye-bolt 140 while the other receives a U-shaped bracket 142 which engages the cantilevered segment 44. A fastener 144 passes through an aperture 146 in the U-shaped bracket 142 and is retained by a hex nut 148 or the like. The U-shaped bracket 142 attaches to the coupler 136 by a threaded bolt 150 located substantially perpendicular to the fastener 144. Although particular types of fasteners are illustrated it should be realized that other fasteners such as clips, pins, cotter pins, and a multitude of other threaded and unthreaded attachments will benefit from the present invention.

Figure 13:
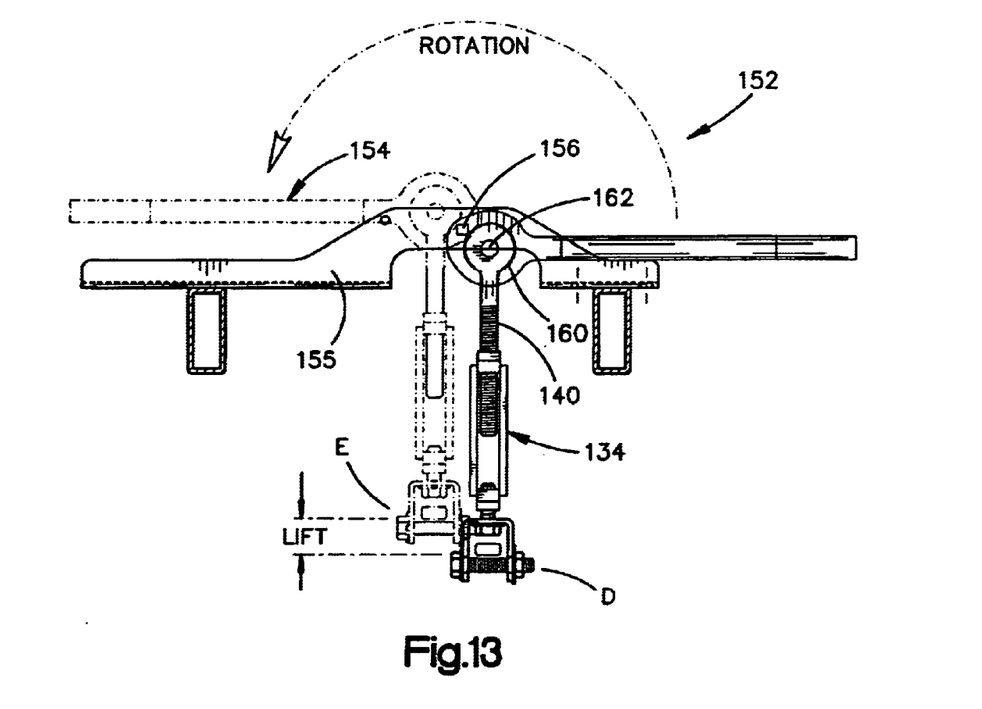
FIG. 13 is an expanded view of another lift assembly utilizing the hanger assembly illustrated in FIG. 12.
Figure 14:
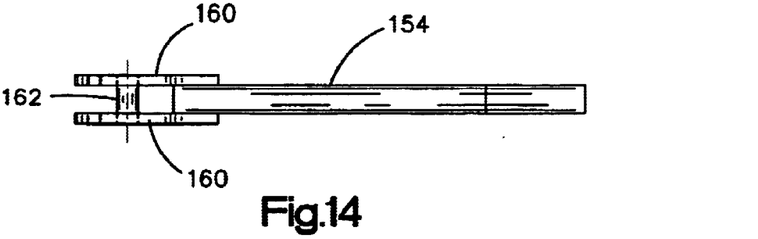
FIG. 14 is an expanded top view of the lever assembly illustrated in FIG. 13.

Referring to FIG. 13, another embodiment of a lift assembly 152 including the hanger assembly 134 of FIG. 12 is illustrated. The lift assembly 152 includes a base 155 which mounts a lever assembly 154 and the hanger assembly 134. The lever 20 assembly 154 includes pivot pins 156 and a pair of plates 160 which sandwich the eyebolt 140 there between (FIG. 14). A pin 162 preferably passes through the plates 160 and eye bolt 140 such that the hanger assembly 134 pivots thereon. The pin 162 is offset from the pivot pin 156 such that the pin 162 and attached hanger assembly 134 is cammed about the pivot pin 156 to supply a mechanical advantage to drive the hanger assembly 134 from a disengaged position D to an engaged position E.

Figures 15, 16A, 16B:
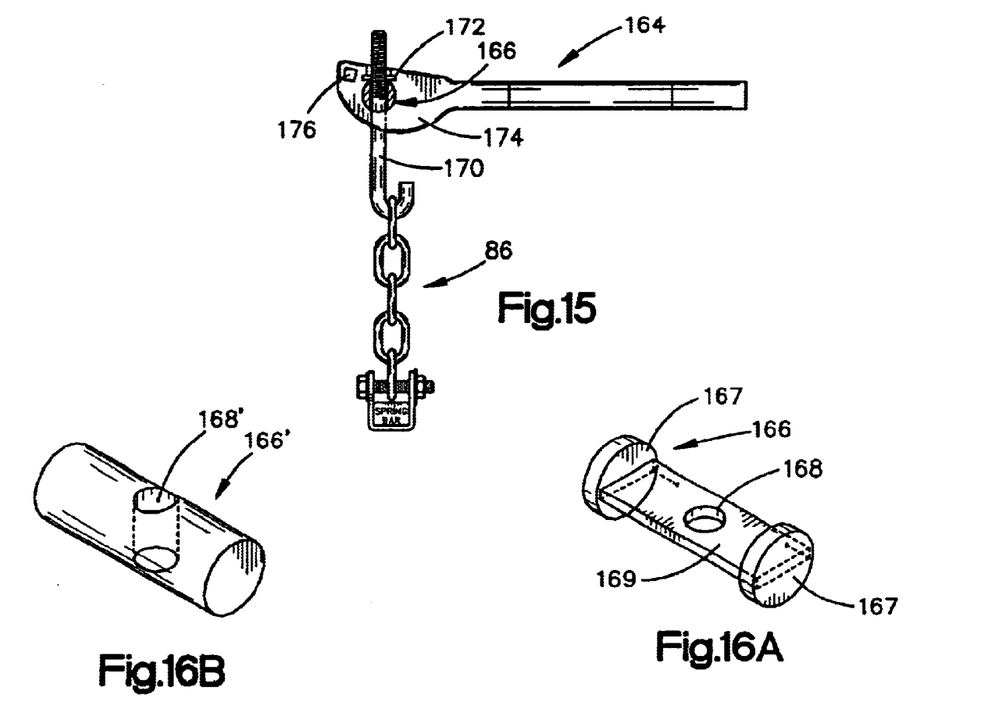
FIG. 15 is an expanded view of yet another lever assembly according to the present invention.
FIG. 16A is an expanded view of a pivot for the lever assembly of FIG. 15.
FIG. 16B is an expanded view of another pivot for the lever assembly of FIG. 15.

By moving the lever assembly 154 in the direction of arrow R, the pin 162 and attached hanger assembly 134 moves about the pivot 156. The hanger assembly 134 is driven from a disengaged position D to an engaged position E. Accordingly, the spring bar 34 (FIG. 1A, 2A and 10) is moved from its free state F to its loaded state L. Referring to FIG. 15, another embodiment of a lever assembly 164 is illustrated. The lever assembly 164 includes a hanger axle 166 (FIG. 16A) which rotates within the lever assembly 164.

The hanger axle 166 preferably includes a pair of circular pivots 167 and a support plate 169 fixed therebetween. An aperture 168 located through the support plate 169 that receives a threaded J-hook 170. The threaded J-hook 170 is retained within the aperture 166 by a threaded hex nut 172 or the like. The height of the threaded J-hook can thereby be adjusted by adjusting the threaded hex nut 172 along the threaded J-hook 170.

Referring to FIG. 16B, another embodiment of the hanger axle 166' is illustrated. The hanger axle 166' is a cylinder having an aperture 168' located therethrough to receive the threaded J-hook 170.

The threaded J-hook 170 engages the hanger assembly 86 described in FIG. 8. Preferably, hanger axle 166 is rotatably retained in the lever assembly 164 between a pair of plates 174 such that the hanger axle is free to rotate on the circular pivots 167. Each plate 174 further includes a pivot 176.

Figure 17:
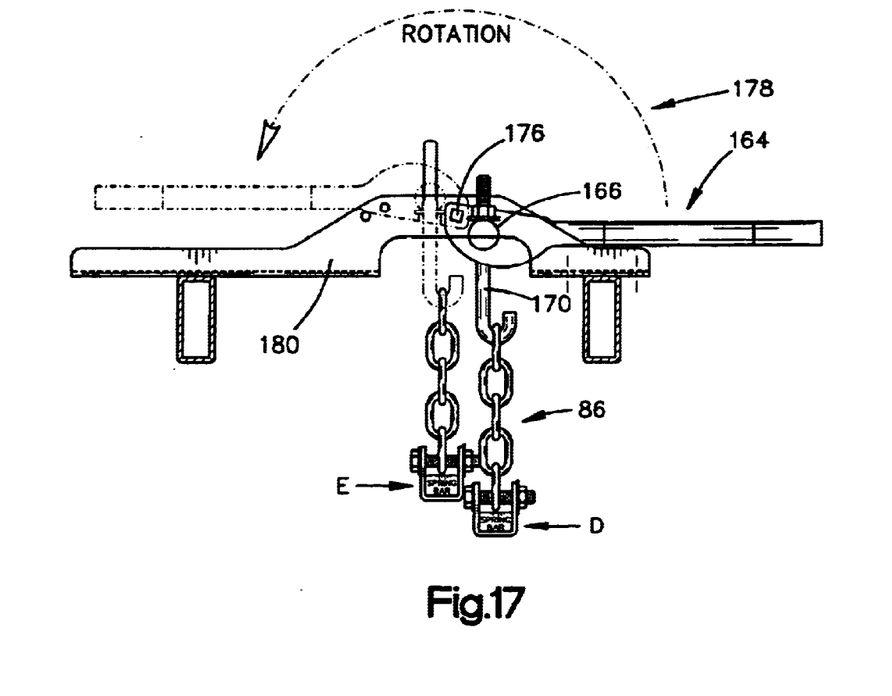
FIG. 17 is an expanded view of another lift assembly utilizing the lever assembly illustrated in FIG. 15.

Referring to FIG. 17, another embodiment of a lift assembly 178 including the hanger assembly 86 of FIG. 8 and the lever assembly 164 of FIG. 15. The lift assembly 178 includes a base 180 which mounts the lever assembly 164 at pivot 176. The hanger axle 166 pivots between the plates 174 such that the hanger assembly 86 pivots thereon during rotation of the lever assembly 164. The pivot 176 is offset from the hanger axle 166 such that the hanger axle 166 and attached hanger assembly 86 is cammed about the pivot 176 to supply a mechanical advantage to drive the hanger assembly 86 from a disengaged position D to an engaged position E. Moreover, as the hanger axle 166 pivots during operation of the lever assembly 164, the hanger assembly 86 chain 96 of FIG. 8 is prevented from becoming tangled.

Although, particular sub-assemblies such as the bent and straight spring bars, lever assemblies, lift assemblies, hanger assemblies, and such may be illustrated in particular embodiments as associated with certain other sub-assemblies, it will be realized that-other combinations will benefit from the teachings of the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

Having thus described the invention, we claim:

1. A weight distributing trailer hitch assembly comprising:
    a hitch head capable of interconnecting a vehicle hitch and a trailer frame;
    not more than one spring bar connected at its proximal end to said hitch head and extending rearwardly therefrom wherein said spring bar defines a jack accessible area whereby said spring bar does not interfere with a trailer jack connected to said trailer frame; and
    a lift assembly supported by said trailer frame and capable of supporting said spring bar during engagement.

2. The weight distributing trailer hitch assembly of claim 1 wherein said jack accessible area is defined by at least a portion of said spring bar extending laterally from a preceding portion of said spring bar.

3. The weight distributing trailer hitch assembly of claim 2 wherein the laterally extending portion of said spring bar extends at an angle from the preceding portion of said spring bar.

4. The weight distributing trailer hitch assembly of claim 3 wherein the angle between the laterally extending portion of said spring bar and the preceding portion of said spring bar is obtuse.

5. A weight distributing trailer hitch assembly comprising:
    a shank for connection with a vehicle hitch;
    a hitch head connected to said shank, said hitch head including means for connecting to a trailer frame;
    not more than one spring bar connected at its proximal end to said hitch head and extending
        rearwardly therefrom wherein said spring bar defines a jack accessible area so that said spring bar does not interfere with a trailer jack connected to said trailer frame; and
    a lift assembly connected to said trailer frame and capable of supporting said spring bar during engagement.

6. The hitch assembly of claim 5 wherein said hitch head is connected to said shank in a vertically adjustable manner.

7. The hitch assembly of claim 6 wherein said spring bar is removably connected to said hitch head.

8. The hitch assembly of claim 7 wherein said trailer frame comprises an A-frame having a first and a second trailer frame member.

9. The hitch assembly of claim 8 wherein a base member spans said first and second trailer frame members and said lift assembly is mounted thereon.

10. The hitch assembly of claim 9 wherein said base member is removably connected to said first frame member.

11. Not more than one spring bar for use in a weight-distributing trailer hitch assembly interconnecting a trailer frame and a trailer hitch, said not more than one spring bar comprising:
    an end segment for connection to said weight-distributing trailer hitch assembly; and
    a cantilever segment extending rearwardly from said end segment wherein a portion of said cantilever segment defines a jack accessible area whereby said cantilever segment does not interfere with a trailer jack connected to said trailer frame.

12. The spring bar of claim 11 wherein said jack accessible area is defined by at least a portion of said cantilever segment extending laterally from a preceding portion of said cantilever segment.

13. The spring bar of claim 12 wherein the laterally extending portion of said cantilever segment extends at an angle from the preceding portion of said cantilever segment.

14. The spring bar of claim 13 wherein the angle between the laterally extending portion of said cantilever segment and the preceding portion of said cantilever segment is obtuse.

* * * * *

UNITED STATES PATENT AND TRADEMARK OFFICE
CERTIFICATE OF CORRECTION

PATENT NO. : 6,860,501 B2 Page 1 of 1
DATED : March 1, 2005
INVENTOR(S) : Lynn Mida It is certified that error appears in the above-identified patent and that said Letters Patent is hereby corrected as shown below:

Title page,
Item [75], Inventors, replace "Kenneth R. Schmidt, Canton, MI (US); Lynn Mida, Chelsea, MI (US); David L. Hoelscher, Livonia, MI (US); Neal Weipert, Redford, MI (US)" with -- Lynn Mida, Chelsea, MI (US) --
Item [73], Assignee, replace "Coquent Towing Products, Inc." with -- Cequent Towing Products, Inc. --

Column 5,
Line 44, please add -- bracket -- immediately after "U-shaped" and immediately before "while."

Column 6,
Line 50, please delete "20."

Signed and Sealed this

Twelfth Day of July, 2005

JON W. DUDAS
*Director of the United States Patent and Trademark Office*